H. E. PENN.
GARTER.
APPLICATION FILED NOV. 24, 1919.
1,381,658.
Patented June 14, 1921.
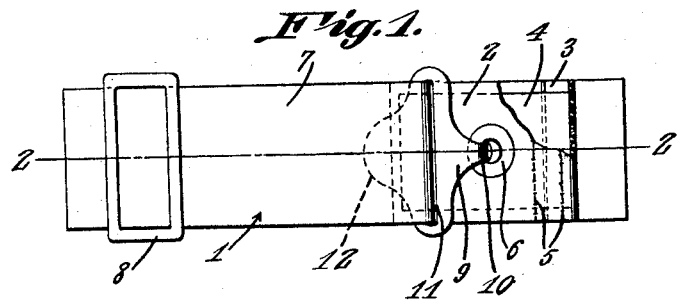
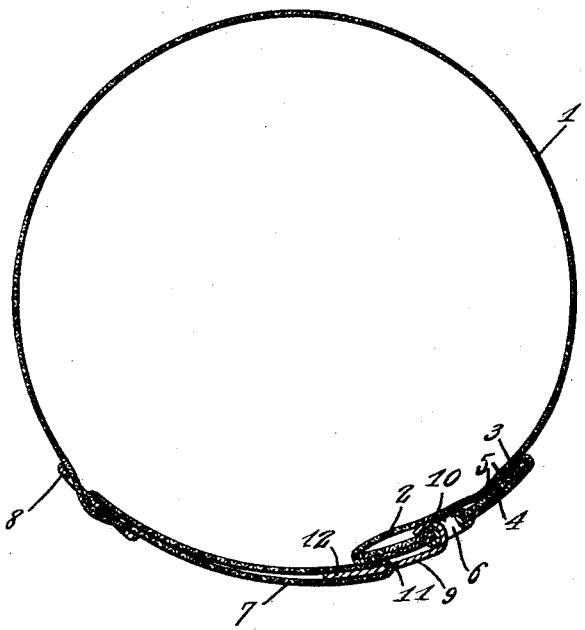

UNITED STATES PATENT OFFICE.

HOLMES E. PENN, OF MADISON, NORTH CAROLINA, ASSIGNOR TO PENN BROS. SUSPENDER COMPANY, INC.

GARTER.

1,381,658.  Specification of Letters Patent. Patented June 14, 1921.

Application filed November 24, 1919. Serial No. 340,208.

*To all whom it may concern:*

Be it known that I, HOLMES E. PENN, a citizen of the United States, residing at Madison, in the county of Rockingham and State of North Carolina, have invented a new and useful Garter, of which the following is a specification.

One object of this invention is to provide a garter which may be adjusted readily as to length, means being provided whereby the ends of the garter may be separated readily at the will of an operator. Another object of the invention is to provide novel means whereby the body of the wearer will be protected against contact with the hook and eye which connect the ends of the garter, one end of the garter being stiffened and reinforced to hold the eye.

In the drawing:—Figure 1 shows, in elevation, a garter constructed in accordance with the invention, parts being broken away; Fig. 2 is a section taken approximately on the line 2—2 of Fig. 1.

The garter forming the subject matter of this application comprises a band 1, made of any suitable material, one end of the band being fashioned into a loop 2, the end of the outer wall of the loop being turned in as shown at 3. One end of a stiffener 4 is received between the outer wall of the loop and the turned in end 3. Stitchings 5 unite the outer wall of the loop 2, one end of the stiffener 4, the end 3 and the inner wall of the loop 2. A tubular eyelet 6 passes through the outer wall of the loop 2 and through the stiffener 4, but not through the inner wall of the loop.

The other end of the band 1 is formed into a loop 7 retained at adjusted lengths by buckle 8 of any desired sort. The numeral 9 marks a plate terminating in a hook 10 adapted to be engaged in the eyelet 6, the plate having a slot 11 through which the loop 7 passes, the plate terminating in a reduced extension 12 received within the loop 7 and serving to steady the plate 9 and its hook 10.

The rear wall of the loop 2 is interposed between the body of the wearer, on the one hand, and the eyelet 6 and the hook 10 on the other hand. However, since the stiffener 4 is employed, a secure mounting for the eyelet 6 is afforded, even though the eyelet is not engaged with the inner wall of the loop 2. The size of the garter may be regulated by shifting the buckle 8, and the garter may be loosened at any time by the detaching the hook 10 from the eyelet 6.

I claim:—

1. A garter comprising a band one end of which is fashioned into a loop, the end of the outer wall of the loop being turned in; a stiffener within the loop and having one end received between the outer wall of the loop and the turned in end thereof; means for uniting the outer wall of the loop, the inner wall thereof, and said turned in end; a tubular eyelet engaged with the stiffener and with the outer wall of the loop and shielded by the inner wall of the loop; and a hook on the other end of the band, the hook being engaged in the eyelet.

2. A garter comprising a band one end of which is fashioned into a loop, the end of the outer wall of the loop being turned in; a stiffener within the loop and having one end received between the outer wall of the loop and the turned in end thereof; means for uniting the outer wall of the loop, the inner wall thereof, the turned in end and said end of the stiffener; a tubular eyelet engaged with the stiffener and with the outer wall of the loop; and a hook on the other end of the band, the hook being engaged in the eyelet, the inner wall of the loop constituting a shield for the hook and for the eyelet.

In testimony that I claim the foregoing as my own, I have hereto affixed my signature in the presence of two witnesses.

HOLMES E. PENN.

Witnesses:
 W. S. CHAMBERS,
 V. H. IDOL.